United States Patent Office 2,753,910
Patented July 10, 1956

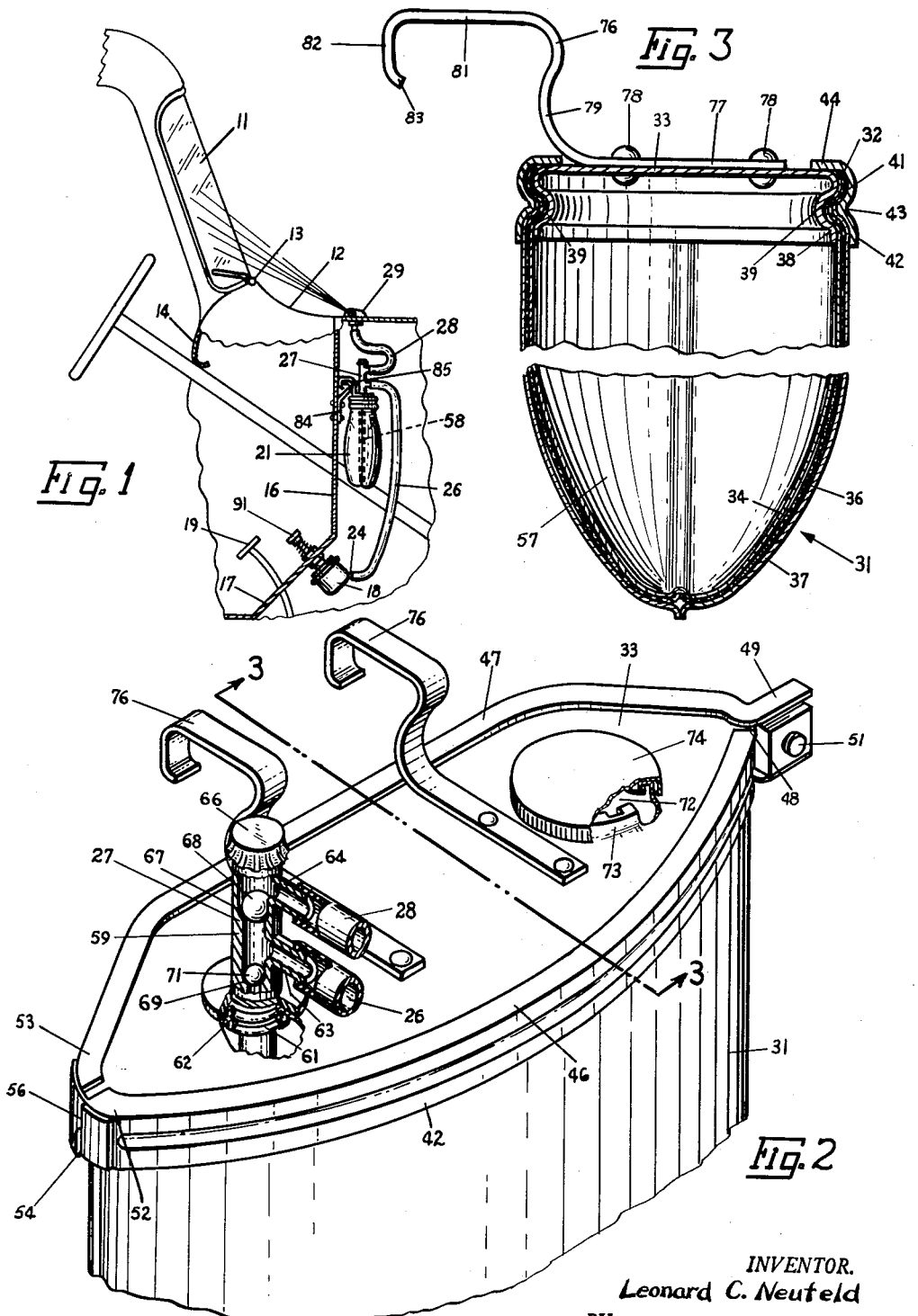

2,753,910

RESERVOIR FOR A WINDSHIELD CLEARING SYSTEM

Leonard C. Neufeld, Des Moines, Iowa, assignor to The Delman Company, Des Moines, Iowa, a partnership Application July 12, 1954, Serial No. 442,744

2 Claims. (Cl. 150—1)

This invention relates generally to automobile windshield clearing systems and more particularly to fluid reservoirs embodied in such systems.

Presently commercially available windshield clearing systems include a glass reservoir or container for storing the fluid which is to be projected onto the windshield. However, these glass containers are unsatisfactory for the reason that they are usually carried on mounting brackets attached to the fire wall and are subject to rattling on such brackets. Also, these glass containers are subject to breakage in shipment, during service work on the automobile engine, and in the freezing of the fluid in the container during cold weather.

An object of this invention, therefore, is to provide an improved fluid reservoir for use in a windshield clearing system.

A further object of this invention is to provide a fluid reservoir which is constructed of metal, fabric and plastic so as to be substantially unbreakable.

Another object of this invention is to provide a fluid reservoir which includes readily replaceable plastic and fabric bag containers for the fluid.

A further object of this invention is to provide a fluid reservoir for use in a vehicle windshield clearing system which is attachable directly to the vehicle fire wall.

A still further object of this invention is to provide a fluid reservoir which is compact and rugged in construction, economical to manufacture, and readily installed in vehicle windshield clearing systems now in use.

Further objects, features and advantages of this invention will become apparent from a consideration of the following description when taken in connection with the accompanying drawing in which:

Fig. 1 is a fragmentary foreshortened longitudinal sectional view of a vehicle showing assembled thereon a windshield clearing system embodying the fluid reservoir of this invention;

Fig. 2 is an enlarged fragmentary perspective view of the fluid reservoir of this invention, shown in assembly relation with a valve unit adapted for use with the reservoir; and Fig. 3 is a transverse sectional view of the reservoir as seen along the line 3—3 in Fig. 2.

With reference to the drawing, there is illustrated in Fig. 1 a windshield clearing system as applied to an automobile having a windshield 11, an engine cowl 12 extended forwardly from the lower front edge 13 of the windshield 11, and an instrument panel or dash board 14 located rearwardly of the windshield 11. The automobile is further equipped with the usual fire wall 16 and an upwardly and forwardly inclined floorboard section 17 which joins with the lower end of the firewall 16.

The clearing system includes a pump unit 18 supported on the floor board section 17 at a position adjacent a vehicle pedal 19 and a liquid container or reservoir 21 carried on the front side of the wall 16. The pump 18 is of the type having a fluid connection 24 which communicates with the reservoir 21 through a flexible tube 26 connected to a three-way valve unit 27 carried by the reservoir 21. A second flexible tube 28 extends from the three-way valve 27 to a fluid discharge nozzle 29 mounted on the automobile at a position to project fluid onto the windshield 11.

The fluid reservoir 21 includes an upright flexible bag or sack container 31 (Figs. 2 and 3), having an upper open end 32, to which is attached a rigid top or cover member 33, constructed of metal, plastic or the like. The container 31 comprises three bag or sack members 34, 36, and 37 arranged in a nested relation, with the inner and outer bags 34 and 37 being formed of a flexible plastic material and with the intermediate bag 36 being formed of a fabric material. The inner and outer bags 34 and 37 are thus fluid tight and the intermediate bag 36 adds body and stiffness to the composite bag container or structure 31.

Received within the upper open end 32 of the container 31 (Fig. 3) is the cover member 33, which is of a flat plate construction formed with a downwardly projected continuous peripheral flange 38. As best appears in Fig. 3, the flange 38 is of an irregular shape to provide a continuous groove 39 in the outer side 41 of the flange 38. A clamping ring 42 (Figs. 2 and 3) has a tongue 43 of a size and shape to be received in the groove 39, and an upper flange 44 which overlies the peripheral or marginal rim portion of the top member 33. As clearly appears in Fig. 2, the ring 42 is formed of two sections 46 and 47 releasably connected at their ends 52 and 53, as by transverse slots 54 and 56 formed in the sections 46 and 47, respectively, and interengaged for releasably holding the ends 52 and 53 in an overlapped relation. The opposite ends 48 and 49 of the ring sections 46 and 47, respectively, are connected together by a clamping bolt 51.

In the assembly of the bag 31 and the cover 33, the upper end 32 of the bag 31 is positioned about the cover member flange 38 and the ring 42 is applied about the bag upper end 32 and the flange 38 to securely clamp the bag upper end 32 between the groove 39 on the flange 38 and the tongue 43 on the ring 42. The bag 31 thus forms with the top member 33 a fluid chamber 57 (Fig. 3) which is fluid tight by virtue of the plastic bag members 34 and 37 and the sealed connection of the upper ends of the bag members 34, 36 and 37 with the cover 33. The chamber 57 is in fluid communication with the valve unit 27 carried by the cover member 33 by virtue of a tube 58 (Fig. 1) carried by the valve unit 27 and extended into the chamber 57.

The valve unit 27, which is constructed of a rigid plastic material, includes an upright tubular body portion 59 (Fig. 2) which has a threaded lower end portion 61 received in a threaded opening 62 in the cover member 33. Intermediate its ends, the body member 59 is integrally formed with a pair of spaced tubular fluid connections 63 and 64. The upper end of the body member is closed by a cap 66 similar to an ordinary bottle cap. Between the fluid connections 63 and 64, the inner surface of the body member 59 is formed with a seat 67 for a ball valve member 68, and between the connection 63 and the lower end of the body member, a second seat 69 is provided for a second ball member 71.

At a position, spaced from the valve unit 27, the cover member 33 is formed with a fill opening 72 defined by an upright flange 73. Removably fitted about the flange 73 so as to close the opening 72, is a cap 74. Secured to the cover 33 at a position between the valve unit 27 and the fill opening 72, are a pair of spaced mounting brackets 76. As best appears in Fig. 3, each bracket 76 has a straight horizontal end portion 77 secured to the cover member 33 by a pair of rivets 78. Extended upwardly from the straight portion 77 is a generally upright intermediate portion 79 formed with a generally horizontal extension 81 which terminates in a downwardly extended leg 82 having a lip or terminal end portion 83 directed downwardly and toward the reservoir 21. For supporting the reservoir on the fire wall 16, a supporting plate 84 (Fig. 1), shaped to cooperate with the bracket 76, is secured to the forward side of the fire wall 16. As shown in Fig. 1, the upper end of the plate 84 terminates in a horizontal portion 85 which is spaced from the firewall 16.

In supporting the reservoir 21 on the supporting plate 84 which is of a length in a direction transversely of the vehicle greater than the distance between the brackets 76, the end portions 81 of the brackets 76 are arranged on the top portion 85 of the plate 84 with the bracket legs 82 between the fire wall 16 and the supporting plate top portion 85. The lips 83 at the free ends of the brackets 76 are positioned adjacent the underside of the supporting plate top portion 85 to prevent any accidental movement of the reservoir 21 off of the supporting plate 84.

To remove the reservoir 21 for replacement of any of the bag members 34, 36 and 37, the reservoir 21 is raised and tilted relative to the supporting plate 84 so that the lips 83 on the free ends of the brackets 76 are clear of the plate 84. Also, if the arrangement of other automobile parts on the firewall 16 permits, the reservoir 21 may be moved transversely of the vehicle until the brackets 76 are in a clearance relation with the supporting plate 84.

It can thus be seen that the reservoir 21 is readily removable from its supported position on the vehicle fire wall 16. Once the reservoir 21 is removed, one or more of the sack members 34, 36 and 37 may be readily replaced when worn out, by merely removing the clamping ring 42 from its position about the flange 38 on the cover 33.

In the operation of the windshield clearing system, a foot operated plunger 91 for the pump 18 is actuated to force fluid under pressure through the flexible tube 26 and into the valve unit 27. This movement of fluid into the valve unit 27 through the connection 63, moves the ball valve 71 into position on the valve seat 69 and unseats the ball valve member 68 so that the fluid travels through the connection 64 and the flexible tube 28 into the discharge unit 29. Fluid in the discharge unit 29 is discharged, through orifices formed in the unit 29, as jets of fluid directed against the windshield 11 and into the path of the usual windshield wipers associated therewith.

When the plunger 91 is released, the suction in the flexible tube 26 unseats the valve member 71 and seats the valve member 68. This suction is therefore transmitted through the tube 58 within the fluid chamber 57 to draw fluid from the reservoir 21 through the tubes 58 and 26 into the pump 18. In other words, fluid is discharged from the nozzle unit 29 when the plunger 91 is depressed and drawn into the pump 18 for subsequent discharge, when the plunger 91 is released. When the supply of fluid within the reservoir 21 is exhausted, the reservoir 21 is again readily filled by merely removing the cap 74 and pouring fluid into the reservoir 21 through the fill opening 72.

From the above description, it can be seen that this invention provides a reservoir 21 for a windshield clearing system, which is economical in construction and which includes the bag members 34, 36 and 37 which are readily removable from the cover member 33 and replaceable when one or more of such bags are worn out. By virtue of the fact that these bags 34, 36 and 37 require no special construction, they can be replaced at a very nominal cost.

Further, the reservoir 21 is readily packed for shipping purposes as a result of the flat construction of the cover 33, the detachable valve unit 27, and the flat bag members 34, 36 and 37. The bag structure 31 cannot rattle and the weight of the reservoir 21 holds the brackets 76 on the support plate 84 so that there cannot be any rattling of these members. By virtue of the metal or plastic construction of the cover 33 and the flexible construction of the bag structure 31, there is no danger of breakage of the reservoir 21 during shipment or during cold weather.

In addition, the rigid cover member 33 supports the sides of the bag structure 31 in a spaced relation and functions as a support for the valve unit 27 and the brackets 76, as well as providing a readily accessible fill opening 72 for the reservoir 21.

Although the invention has been described with respect to a preferred embodiment thereof, it is to be understood that it is not to be so limited, since changes can be made therein which are within the full intended scope of this invention as defined by the appended claims.

I claim:

1. For use in an automobile windshield clearing system, a fluid reservoir adapted to be attached in an upright position to the automobile, said reservoir comprising a rigid top member, a flexible sack container having an upper open end of a size to be secured about said rigid top member, with said sack container being of a size downwardly from said upper open end so as not to project outwardly of said end, mounting members carried by said top member and adapted to be engaged with said automobile for supporting the reservoir in said upright position, and a fluid outlet member for said reservoir carried by said top member and connectible in said clearing system.

2. For use in a vehicle windshield celaring system, a fluid reservoir comprising a flexible bag structure having an open end, said bag structure including a plastic sack member positioned in a nested relation within a fabric sack member, a rigid cover member removably received within the open end of said bag structure, an adjustable clamping ring positioned about the open end of said bag structure and said cover member for holding said bag structure on said cover member, a fluid outlet connection carried by said cover member in fluid communication with said reservoir, with said cover member having a fill opening positioned in a spaced relation with said outlet connection, and means carried by said cover member for supporting the reservoir in an upright position.

References Cited in the file of this patent

UNITED STATES PATENTS

| | | |
|---|---|---|
| 1,923,522 | Whitehouse | Aug. 22, 1933 |
| 2,049,220 | Pearce | July 28, 1936 |
| 2,289,650 | Horton | July 14, 1942 |
| 2,531,745 | Schopmeyer | Nov. 28, 1950 |
| 2,612,924 | Cunningham | Oct. 7, 1952 |
| 2,687,158 | Owen | Aug. 24, 1954 |